United States Patent
Bachmann et al.

(10) Patent No.: US 11,525,431 B2
(45) Date of Patent: Dec. 13, 2022

(54) METHOD AND SYSTEM FOR CONTROLLING A WIND TURBINE TO MANAGE EDGEWISE BLADE VIBRATIONS

(71) Applicant: VESTAS WIND SYSTEMS A/S, Aarhus N (DK)

(72) Inventors: Thomas Hedegaard Bachmann, Randers NV (DK); Anders Steen Nielsen, Højbjerg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 270 days.

(21) Appl. No.: 16/968,860

(22) PCT Filed: Feb. 4, 2019

(86) PCT No.: PCT/DK2019/050042
§ 371 (c)(1),
(2) Date: Aug. 10, 2020

(87) PCT Pub. No.: WO2019/154470
PCT Pub. Date: Aug. 15, 2019

(65) Prior Publication Data
US 2021/0010457 A1    Jan. 14, 2021

(30) Foreign Application Priority Data
Feb. 9, 2018    (DK) .................. PA 2018 70082

(51) Int. Cl.
F03D 7/02    (2006.01)
(52) U.S. Cl.
CPC ......... *F03D 7/0296* (2013.01); *F03D 7/0204* (2013.01); *F03D 7/0224* (2013.01);
(Continued)

(58) Field of Classification Search
CPC .... F03D 7/0276; F03D 7/0296; F03D 7/0204; F03D 7/0224; F03D 7/02444;
(Continued)

(56) References Cited

U.S. PATENT DOCUMENTS

| | | |
|---|---|---|
| 2003/0151260 A1 | 8/2003 | Siegfriedsen |
| 2010/0301604 A1* | 12/2010 | Nielsen ................. F03D 7/0204 290/44 |
| 2012/0257967 A1 | 10/2012 | Egedal et al. |

FOREIGN PATENT DOCUMENTS

| | | | |
|---|---|---|---|
| DK | 201470481 A1 | 8/2015 | |
| WO | WO-2015085465 A1 * | 6/2015 | ............. F03D 15/10 |

(Continued)

OTHER PUBLICATIONS

PCT International Search Report for Application No. PCT/DK2019/050042, dated Apr. 16, 2019.

(Continued)

*Primary Examiner* — Woody A Lee, Jr.
*Assistant Examiner* — Jesse M Prager
(74) *Attorney, Agent, or Firm* — Patterson + Sheridan, LLP

(57) ABSTRACT

A method of controlling a wind turbine for the avoidance of edgewise vibrations. The method comprises the steps of determining a whirling mode frequency of a rotor blade of the wind turbine; determining a rotational frequency of the rotor blade corresponding to the speed of the rotor blade; determining a threshold value for the whirling mode frequency based on the rotational frequency; and, reducing the speed of the rotor blade if the whirling mode frequency substantially equals or is less than the threshold value.

17 Claims, 10 Drawing Sheets

(52) U.S. Cl.
CPC ......... *F03D 7/0244* (2013.01); *F03D 7/0276* (2013.01); *F05B 2220/30* (2013.01); *F05B 2270/101* (2013.01); *F05B 2270/327* (2013.01); *F05B 2270/334* (2013.01); *Y02E 10/72* (2013.01)

(58) Field of Classification Search
CPC ............ F05B 2220/30; F05B 2270/101; F05B 2270/334; F05B 2270/327
See application file for complete search history.

(56) References Cited

FOREIGN PATENT DOCUMENTS

| WO | 2017092773 A1 | 6/2017 |
|---|---|---|
| WO | 2017174094 A1 | 10/2017 |
| WO | 2019154470 A1 | 8/2019 |

OTHER PUBLICATIONS

PCT Written Opinion International Searching Report for Application No. PCT/DK2019/050042 dated Apr. 16, 2019.
Danish Patent and Trademark Office 1st Technical Examination for Application No. PA 2018 70082 dated Sep. 28, 2018.

* cited by examiner

METHOD AND SYSTEM FOR CONTROLLING A WIND TURBINE TO MANAGE EDGEWISE BLADE VIBRATIONS

TECHNICAL FIELD

Aspects of the invention relate to a method and system for controlling a wind turbine and, more particularly, to identifying and mitigating unacceptable vibrations in the rotor blades of the wind turbine.

BACKGROUND

Wind turbines are designed to operate reliably and safely under a wide range of wind conditions. However, despite careful design practices, some operational conditions may result in oscillations of the wind turbine components, particularly the rotor blades. Such oscillations can compromise the reliable operation of the wind turbine, and this is particularly the case if the frequency of the oscillations coincides with resonant frequencies of the wind turbine components.

One source of oscillation is the vibration of rotor blades in the edgewise direction. Edgewise vibrations at certain amplitudes can cause damage to the blades, but also to other components of the wind turbine.

It is known to strengthen and stiffen the blades with carbon fibres in order to modify the structural frequencies of the blades to avoid resonant edgewise vibrations at certain frequencies. However, this approach significantly adds to the overall cost of manufacturing the blades.

The present invention aims to address at least some of the abovementioned issues.

SUMMARY OF THE INVENTION

According to a first aspect of the invention, there is provided a method of controlling a wind turbine for the avoidance of edgewise vibrations. The method comprises determining a whirling mode frequency of a rotor blade of the wind turbine; determining a rotational frequency of the rotor blade corresponding to the speed of the rotor blade; determining a threshold value for the whirling mode frequency based on the rotational frequency; and, reducing the speed of the rotor blade if the whirling mode frequency substantially equals or is less than the threshold value. Reducing the speed of the rotor results in a corresponding reduction in the rotational frequency, thereby causing a divergence of the two frequencies. This divergence reduces the likelihood of resonant conditions developing, which could otherwise result in excessive edgewise vibrations of the rotor blade.

Preferably, the threshold is determined as a function of the rotational frequency and ambient wind conditions. The ambient wind conditions may be measured directly using one or more sensors, such as a wind speed sensor. Alternatively, the ambient wind conditions could be determined indirectly by measuring something, such as the dynamics of the rotor blade, which correlates with the ambient wind conditions, and using the correlation to determine characteristics of the ambient wind conditions, such as, for example, wind speed and wind turbulence.

Preferably, the speed of the rotor blade is reduced until the whirling mode frequency is greater than the threshold value. By taking corrective action that results in the whirling mode frequency being greater than the threshold value, the onset of resonant conditions is avoided.

Preferably, the whirling mode frequency is one or more of a forward whirling mode or a backward whirling mode. It is particularly advantageous to be able to determine the forward and backward whirling mode frequency independently, as well as simultaneously, as this provides flexibility of control and allows tailoring of the determination according to wind conditions.

Preferably, the whirling mode frequency is determined as function of the rotational frequency and a predetermined edgewise vibration frequency of the rotor blade.

Preferably, the method further comprises measuring a signal indicative of a vibrational movement of the rotor blade; determining a frequency spectrum of the measured signal in the proximity of the whirling mode frequency; obtaining a central frequency from the frequency spectrum; and, adjusting the whirling mode frequency with respect to the central frequency. This method identifies the frequency content in the movement of the rotor blade that can be considered attributable to the edgewise vibration of the blades and then calibrates the determined whirling mode frequency to assure its accuracy. Preferably, the whirling mode frequency is adjusted to equal the central frequency.

Preferably, the method further comprises measuring a signal indicative of a vibrational movement of the rotor blade; and, increasing the threshold value relative to the rotational frequency if the signal indicates that the rotor blade is moving; or, decreasing the threshold value relative to the rotational frequency if the signal indicates that the rotor blade is not moving.

Preferably, the signal is indicative of an edgewise vibration of the rotor blade.

Preferably, the signal is an acceleration signal indicative of the movement of the tower top of the wind turbine.

Preferably, the whirling mode frequency is greater than the rotational frequency.

Preferably, the wind turbine is operated in full load operation mode, meaning that the wind speed is at or above a rated wind speed. The method may also be used for a wind turbine operating in partial load operation mode, where the wind speed is below a rated wind speed, as well as in full load operation mode. However, in particular, the method may advantageously be used for a wind turbine, the design of which carries a risk that the whirling mode frequency will approach the rotational frequency to an extent that gives rise to resonant conditions when operated in the full load operation mode.

According to a second aspect of the invention, there is provided controller for a wind turbine control system comprising a processor and a memory module, wherein the memory module comprises a set of program code instructions which when executed by the processor implement a method according to the first aspect of the invention.

According to a third aspect of the invention, there is provided a wind turbine comprising the controller according to the second aspect of the invention.

According to a fourth aspect of the invention, there is provided a computer program product downloadable from a communication network and/or stored on a machine readable medium comprising program code instructions for implementing a method according to the first aspect of the invention.

BRIEF DESCRIPTION OF THE DRAWINGS

The above and other aspects of the invention will now be described, by way of example only, with reference to the accompanying drawings, in which.

DESCRIPTION

Figure 1:
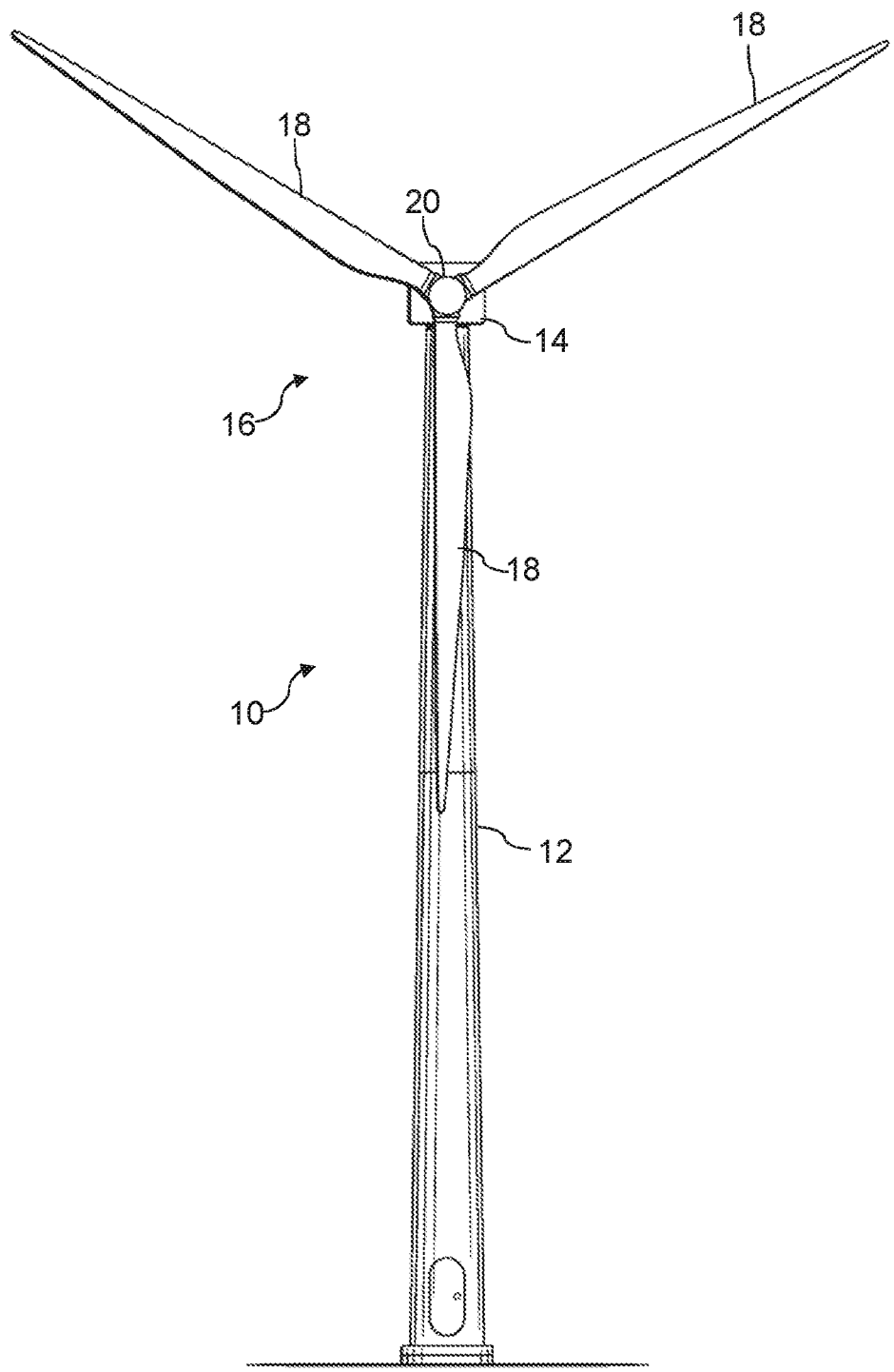
FIG. 1 is a schematic view of a wind turbine according to an embodiment of the present invention.

FIG. 1 shows a wind turbine 10 comprising a tower 12 supporting a nacelle 14 to which a rotor 16 is mounted. The rotor 16 comprises a plurality of wind turbine blades 18, wherein each blade 18 of the plurality of wind turbine blades 18 extends radially from a central hub 20. In this example, the rotor 16 comprises three blades 18, although it will be apparent to those skilled in the art that other configurations are possible.

Figure 2:
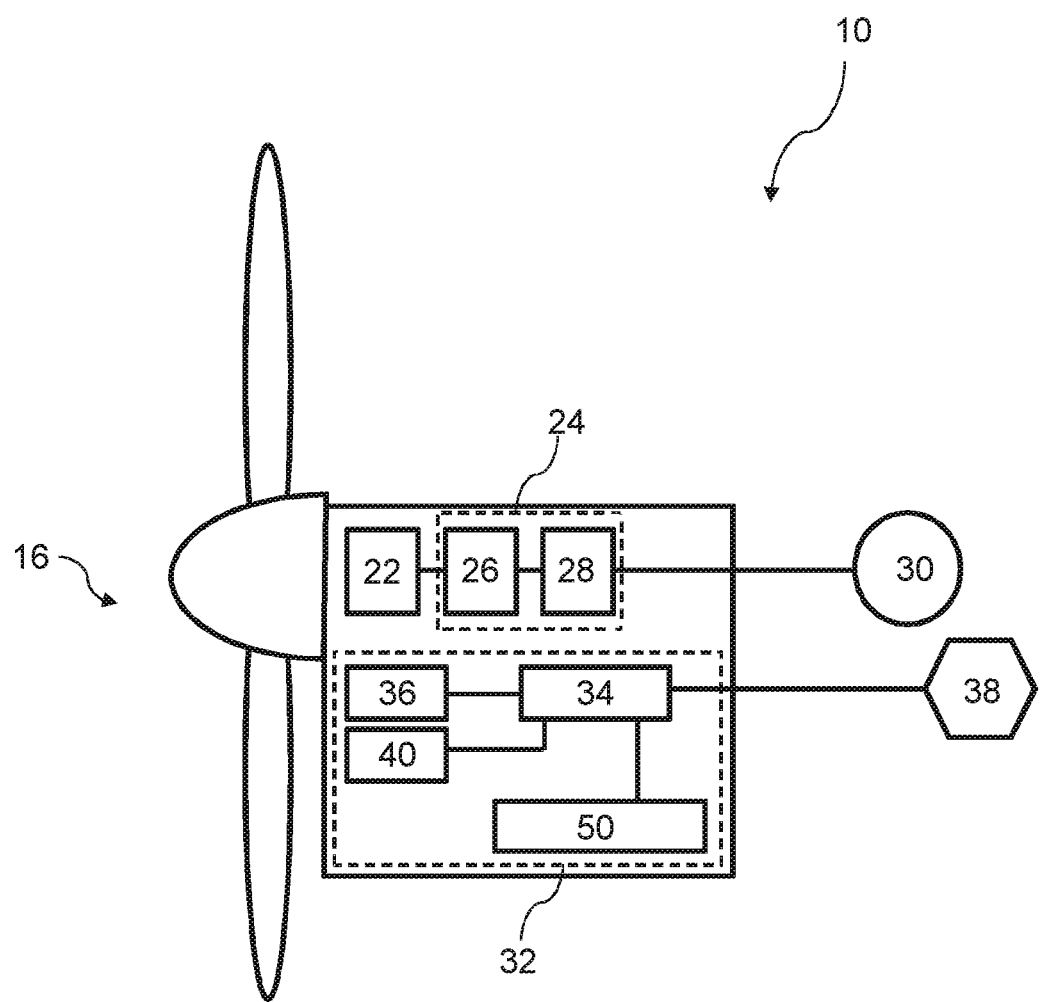
FIG. 2 is a schematic systems view of the wind turbine in FIG. 1.

With reference also to FIG. 2, which is a schematic illustration of the wind turbine 10 at a systems level, the wind turbine 10 further comprises a gearbox 22 and a power generation system 24 including a generator 26 and a power converter system 28. As is known, the gearbox 22 gears up the rotational speed of the rotor 16 and drives the generator 26, which in turn feeds generated power to a converter system 28. Usually such a system will be based on three-phase electrical power, although this is not essential. Other wind turbine designs are known, such as 'gearless' types, also known as 'direct drive', as well as 'belt drive' transmission types.

The generator 26 and converter system 28 may, as examples, be based on a full-scale converter (FSC) architecture or a doubly-fed induction generator (DFIG) architecture, although other architectures would be known to the skilled person.

In the illustrated embodiment, the power output of the converter system 28 of the wind turbine 10 is transmitted to a load, which is shown here as an electrical grid 30. The skilled person would be aware that different power conversion and transmission options exist.

The wind turbine 10 further comprises a control means 32 that is operable to monitor the operation of the wind turbine 10 and to issue commands thereto to achieve a set of control objectives. The control means 32 is shown in FIG. 2 as a simplified, schematic overview of a plurality of control units and modules, and also in FIG. 3, as a more detailed example of how specific units and modules may be arranged in order to facilitate data exchange between them.

The control means 32 comprises a processor 34 configured to execute instructions that are stored in and read from a memory module 36 and/or an external data store that forms part of an external network 38. Measurement data may also be stored in the memory module 36, and recalled in order to execute processes according to the instructions being carried out by the processor 34.

Instructions and data may also be received from external controllers or sensors that form part of the external network 38, and recorded data and/or alerts may be issued over the external network 38 to be stored/displayed at an external source for analysis and remote monitoring.

In addition, the processor 34 is in communication with a plurality of sensors 40 that are disposed within the wind turbine 10. For example, as shown in FIG. 3, the plurality of sensors 40 may comprise a tower accelerometer 42, a rotor speed sensor 44, a blade pitch angle sensor 46, a nacelle yaw angle sensor 48, and a wind speed sensor 49.

The control means 32 of the wind turbine 10 also includes at east one control unit 50.

Figure 3:
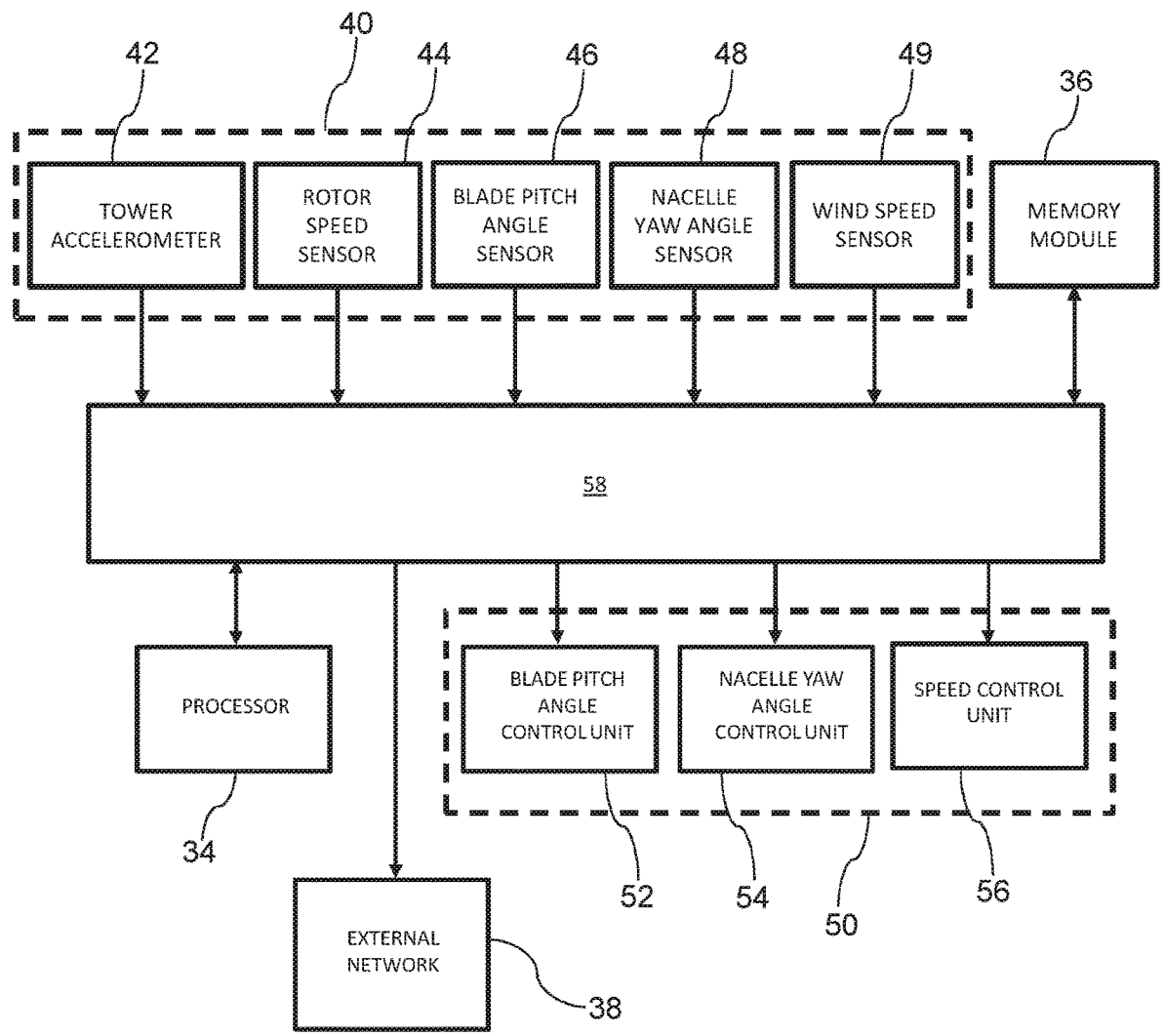
FIG. 3 is a detailed schematic systems view of a monitoring and control system of the wind turbine system of FIG. 2.

In the configuration shown in FIG. 3, three control units 50 are included, namely: (i) a blade pitch angle control unit 52 for altering the blade pitch angle of the rotor blades 18; (ii) a nacelle yaw angle control unit 54 for altering the yaw angle of the nacelle 14; and, (iii) a speed control unit 56 that is used to alter the rotor speed of the wind turbine 10 using a brake, for example. In an alternative embodiment, the control means 32 includes a production controller (not shown), which controls the rotor speed of the wind turbine 10 through converter control and pitch control, depending on the specific control setup, thereby removing the need for a dedicated speed control unit 56.

It should be appreciated that the wind turbine 10 would include more control units 50, and that FIG. 3 is provided only to illustrate an example of a system architecture in which the invention may be implemented.

A principal function of the control means 32 is to control power generation of the wind turbine 10 so that it optimises power production under current ambient wind conditions and in accordance with demanded power generation by a transmission grid operator. However, in addition to its main power control tasks, the control means 32 may be operable to perform a suite of safety and diagnostic monitoring functions and solutions. In the embodiments of the invention, one of these functions is to assess the conditions giving rise to unacceptable blade edgewise vibrations, and to control the wind turbine 10 accordingly. The identification of blade edgewise vibrations is important, as it may aid in preventing damage to the wind turbine 10 due to unwanted oscillation of the rotor 16 during operation. Additionally, monitoring should be undertaken to ensure that dangerous levels of vibration are not reached.

Figure 4:
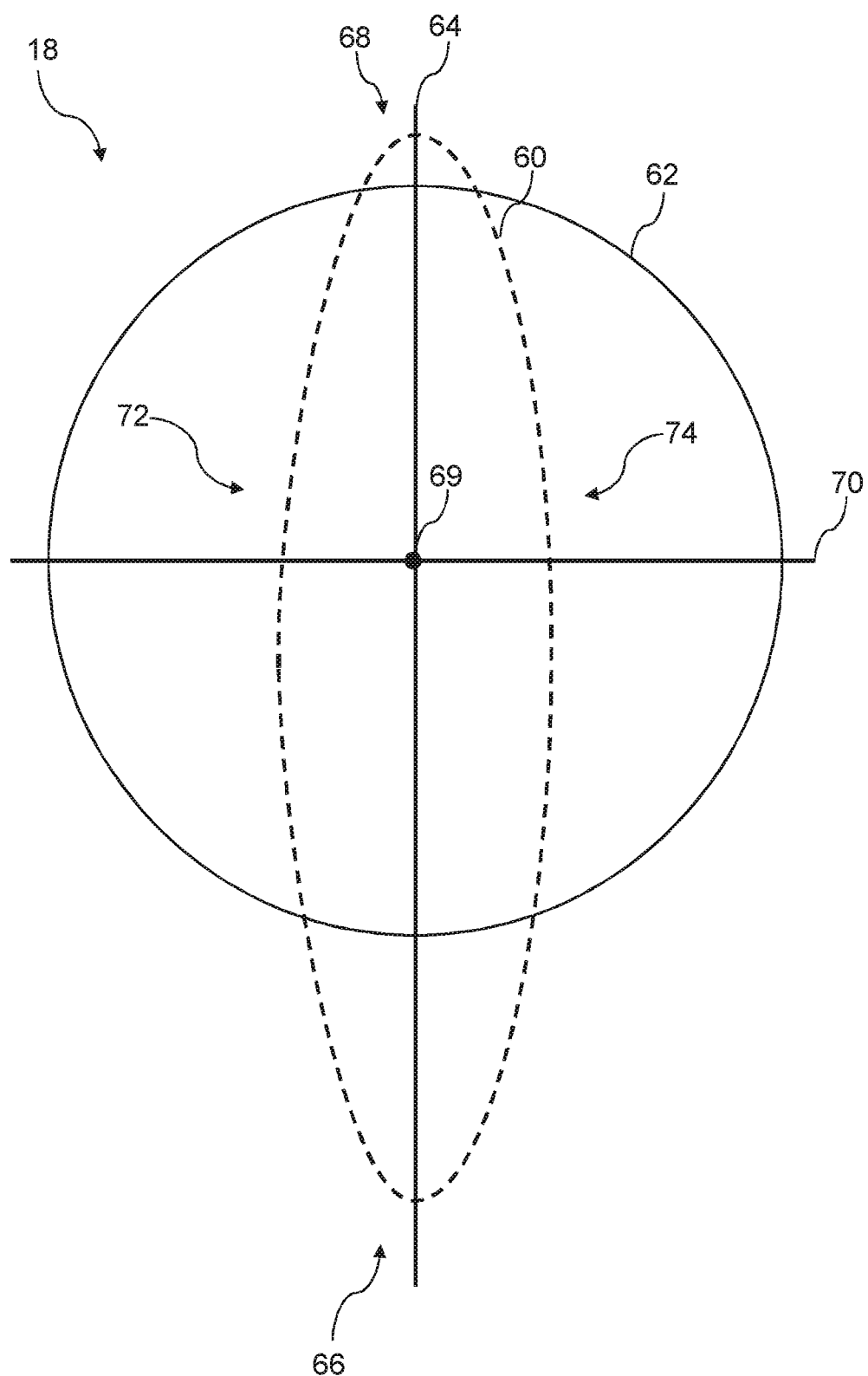
FIG. 4 is a diagram illustrating a schematic cross section of a wind turbine rotor blade.
Figure 5:
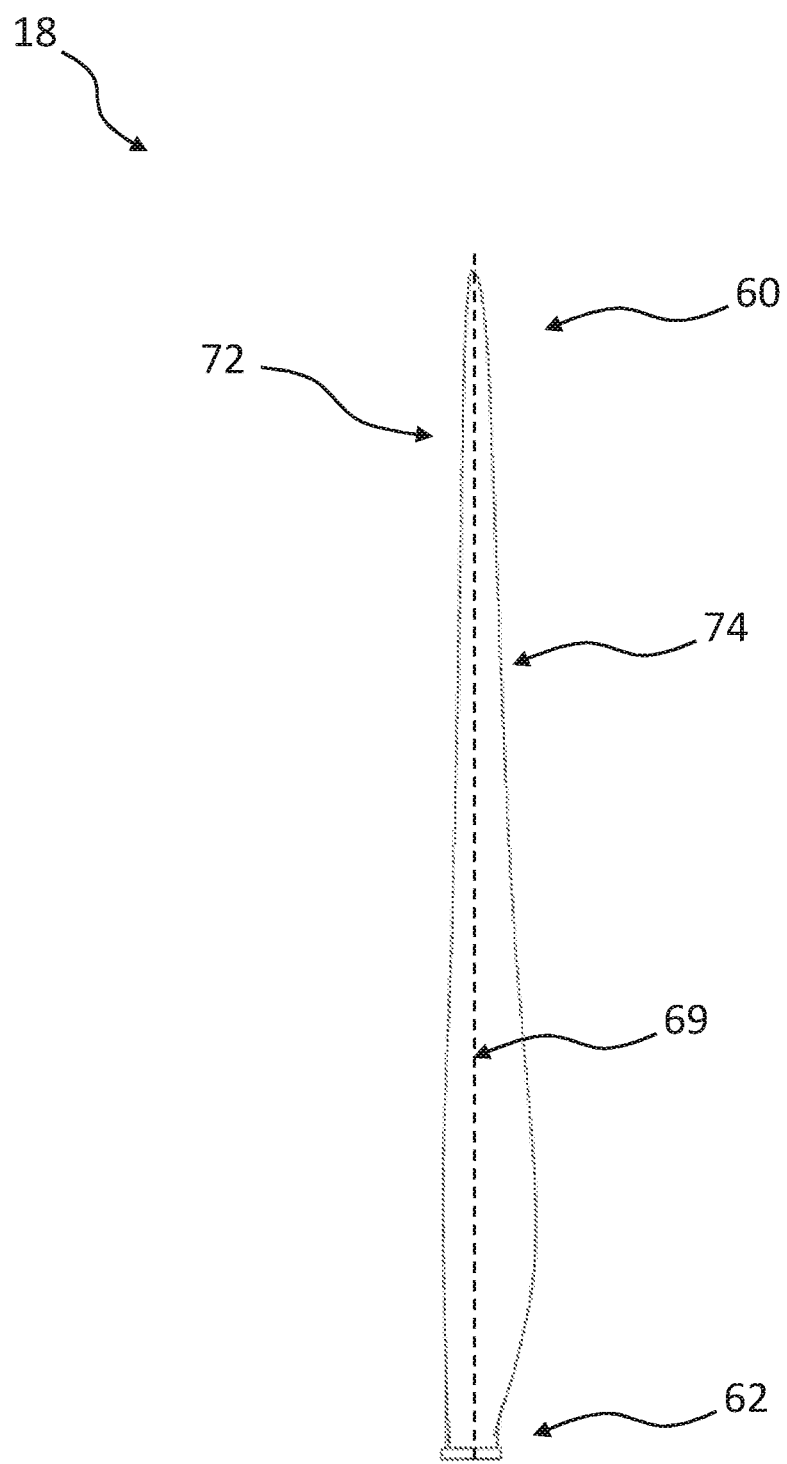
FIG. 5 is a side view of the wind turbine rotor blade of FIG. 4.

Edgewise vibrations of rotor blades occur along the length of the blade in the edgewise direction, which is one of two main directions in which the blade principally vibrates and oscillates. The other main direction of oscillation is in a "flapwise" direction. Referring to FIGS. 4 and 5, when considering a rotor blade 18 having an outboard blade section 60, indicated by dotted lines in FIG. 4, and a circular blade root 62, oscillations in the edgewise direction cause the blade 18 to move along an edgewise axis 64 which extends generally through the leading and trailing edges 66, 68 of the blade 18. The edgewise axis 64 is therefore substantially perpendicular to the longitudinal axis 69 of the blade 18. Similarly, oscillations in the flapwise direction cause the blade to move relative to a flapwise axis 70 which extends through the upper and lower surfaces 72, 74 of the blade 18 and is substantially perpendicular to both the longitudinal axis 69 and the edgewise axis 64 of the blade 18. A blade may oscillate in both flapwise and edgewise directions simultaneously.

When the rotor 16 is turning, oscillations of the blades 18 along their edgewise axes can cause movement of the blade 18 in the same plane as the plane of rotation of the rotor 16. Since edgewise oscillation of the blades 18 excites the rotor 16 with a force that is transverse to its longitudinal axis, in resonant conditions this may result in the rotational axis of the rotor shaft describing an erratic pattern of motion. This phenomenon is known as 'whirling'.

The seemingly complex pattern of motion of the rotor 16 is the result of two circularly rotating force vectors that are generated by the combined oscillatory behaviour of the blades 18. A first force vector rotates in the same rotational direction as the rotor 16 but at a higher frequency (progressive force vector) and a second force vector that rotates in a direction opposite to that of the rotor and at a lower frequency (regressive force vector). The result of the progressive and regressive force vectors is a force vector that traces an elliptical path, when viewed in a rotating reference frame aligned with the rotor 16.

The phase difference between the edgewise oscillations of the blades determines whether whirling occurs in the same direction as the rotor rotation, which is generally known as forward whirl or 'forward whirling mode', or whether whirling occurs in a direction opposite to that of the rotor rotation, which is generally known as backward whirl or 'backward whirling mode'.

As will be appreciated, whirling of the rotor shaft imparts lateral forces to the nacelle 14 via the rotor 16 and therefore causes it to sway from side to side. This motion may be detectable by monitoring the behaviour of the nacelle 14 or the upper portion of the tower 12, and motion at a whirling frequency above a certain level can be considered to be indicative of the blades 18 oscillating unacceptably in the edgewise direction. It is this movement that the inventor has appreciated can be used to identify blade edgewise vibrations and to take mitigating action.

Figure 6:
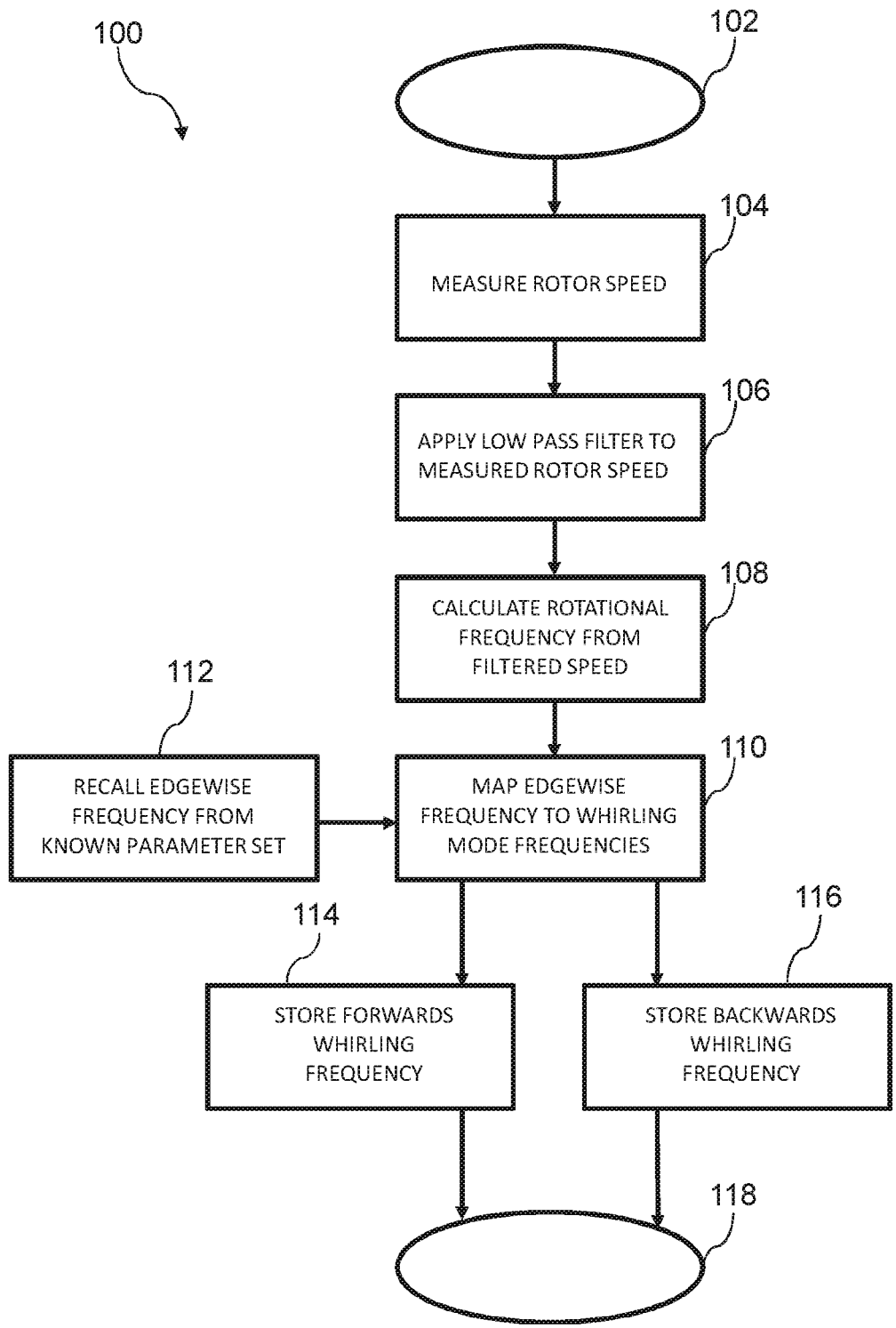
FIG. 6 is a flow chart that illustrates a process by which the forward and backward whirling mode frequencies of the wind turbine of FIG. 1 may be calculated.
Figure 7:
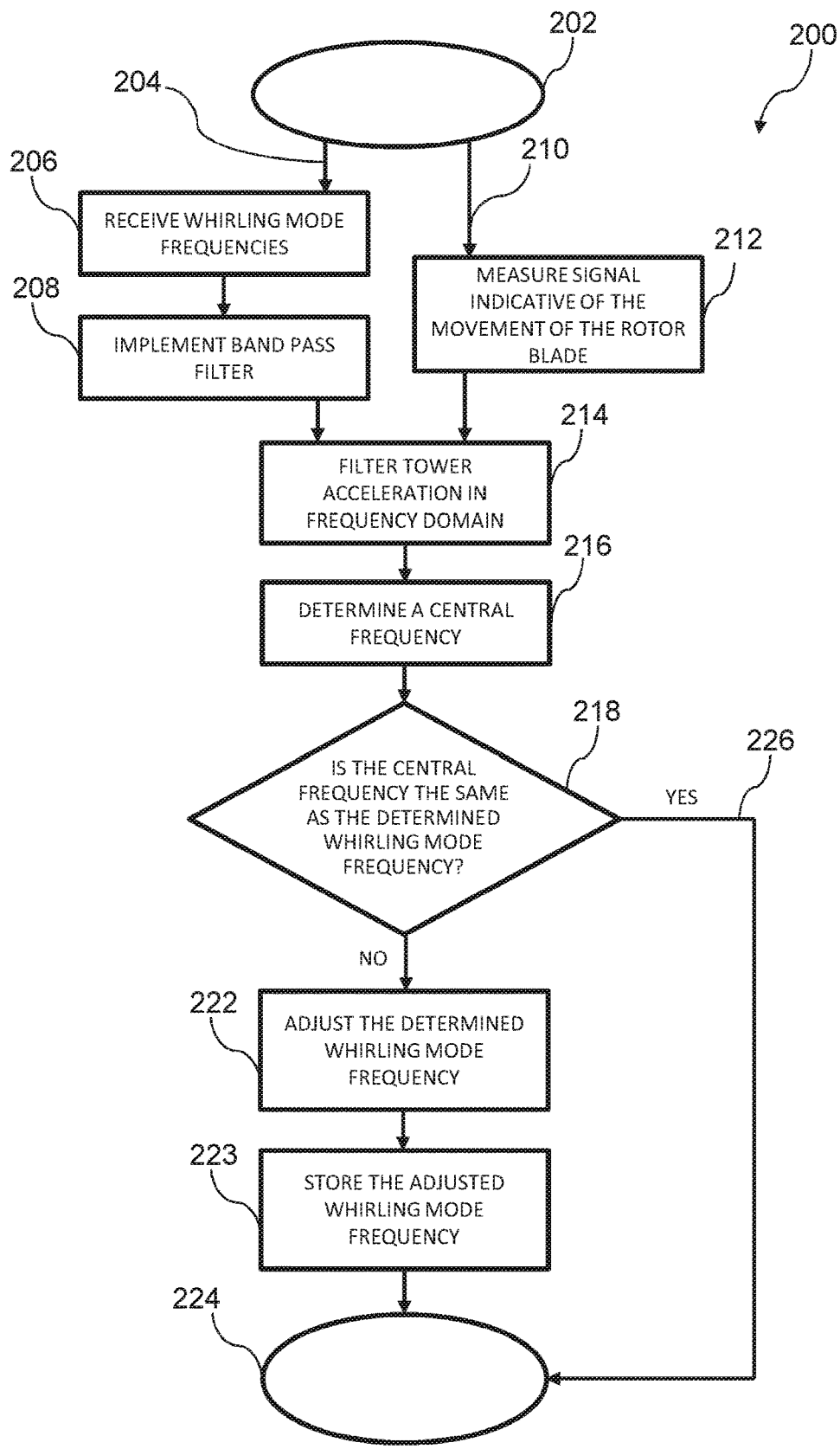
FIG. 7 is a flow chart that illustrates an additional process by which the forward and backward whirling mode frequencies of the wind turbine of FIG. 1 may be calculated.
Figure 8:
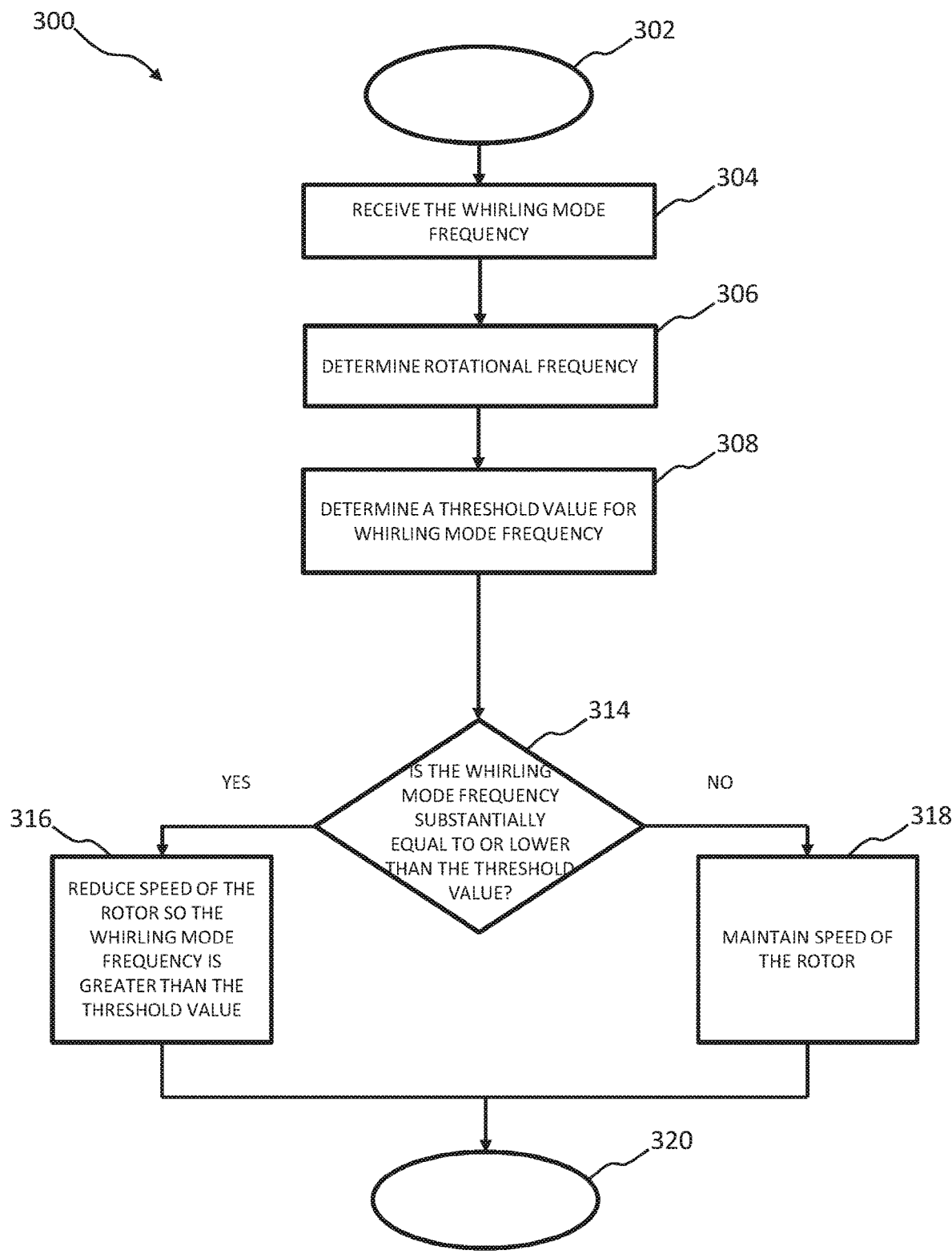
FIG. 8 is a flow chart that illustrates a process for controlling the wind turbine of FIG. 1; and, FIG. 9 is a flow chart that illustrates a process for altering the threshold value determined in the process shown in FIG. 8; and, FIG. 10 shows graphs illustrating the process shown in FIG. 8, In the drawings, like features are denoted by like reference numerals.

FIGS. 6 to 8 are flow diagrams of processes according to embodiments of the invention. FIGS. 6 and 7 both show flowcharts of processes 100, 200 by which the frequency of the forward and backward whirling modes may be calculated. FIG. 8 is a flowchart of a process 300 for controlling a wind turbine 10, based on identification of the whirling mode frequencies. These processes may be implemented using the system architectures outlined in FIGS. 2 and 3.

The process 100 of FIG. 6 initiates at step 102, and at the second step 104, the rotor speed is measured by the rotor speed sensor 44. A time series of the rotor speed, measured over a predetermined measurement period by the rotor speed sensor 44, is created and at the next step of the process 106, a low pass filter is applied to the rotor speed time series measurement. By applying a low pass filter, an average rotor speed signal is obtained.

From the average rotor speed, a rotational frequency is calculated 108. The process moves to the next step 110, where, by using a predetermined edgewise frequency value 112 and the rotational frequency 108, the whirling mode frequencies can be mapped 110. The edgewise frequency 112 is the frequency at which the rotor blades 18 vibrate in the edgewise direction, and is a known parameter of the rotor blades 18 that is stored and recalled from the memory module 36. The edgewise frequency value 112 may be calculated using a number of techniques, for example it may be calculated based on structural models of the specific blade type used on the wind turbine 10 or it may be determined by way of subjecting that specific blade type to a testing procedure designed to identify the natural edgewise frequency (eigenfrequency) of the blade.

In one embodiment, the mapping 110 of the edgewise frequency to forward and backward whirling mode frequencies is envisaged to be a subtraction and addition of the two component frequencies, i.e. the backward whirling mode frequency is calculated by subtracting the rotational frequency 108 from the edgewise frequency 112, and the forward whirling mode frequency is calculated by the addition of the rotational frequency 108 and the edgewise frequency 112. The mapping of higher order modes is also envisaged.

Following the mapping step 110, whirling mode frequencies, which correspond to a forward whirling mode and a backward whirling mode, are obtained. These whirling mode frequencies are then stored 114, 116 in the memory module 36 for subsequent use, before the process terminates at step 118. It is envisaged that the process repeats continually so as to re-calculate the whirling mode frequencies to ensure they are accurate. It will be appreciated by those skilled in the art that the various whirling mode frequencies of the wind turbine 10 could also be determined during the design of the blade 18 and/or modelling of the rotor 16.

Once the whirling mode frequencies have been calculated, a further process 200. as illustrated in FIG. 7, may be used to calibrate the determined whirling mode frequencies, as will now be described.

The process 200 initiates at step 202, which may be when the wind turbine 10 has been started but prior to reaching a power generating state or during a production state.

Initially, the process 200 proceeds along two branches simultaneously. At a first branch 204, a whirling mode frequency is received 206. The whirling mode frequency is calculated according to the process 100 shown in FIG. 6, and recalled from the memory module 36 by the processor 34. In another embodiment of the invention, the whirling mode frequency may be a parameter stored within the memory module 36 that has been calculated or predetermined in some other way, for example determined during the design of the blade 18 and/or modelling of the rotor system.

It will be appreciated that both of the whirling mode frequencies calculated using the process 100 or otherwise determined may be used in the process 200 by implementing two of the processes 200 simultaneously. However, for ease of understanding the following discussion will be based on analysing data relating to a single whirling mode frequency.

Having received the whirling mode frequency, the processor 34 implements, at step 208, a band-pass filter having a centre frequency set as equal to the whirling mode frequency. A bandwidth for the filter may be a set bandwidth for each whirling mode frequency, or it may vary according to the frequency and/or speed of the rotor. It is envisaged, however, that the bandwidth of the filter would be in the range 0.1 Hz to 0.5 Hz, although it is possible that smaller or greater bandwidths could be used depending on the intended outcome.

In a second initial branch 210 of the process 200, at step 212, a signal indicative of the edgewise vibrational movement of the blades 18 is measured. The signal may include a component of tower acceleration in a direction parallel to the rotor plane, i.e. transverse to a longitudinal axis of the nacelle. The tower acceleration is measured using a sensor, such as the accelerometer 42, either mounted within the nacelle 14 or located towards the top of the tower 12. The processor 34 receives an acceleration measurement time series over a respective period of time. The period over which measurements are made may vary according to the speed of the rotor 16 or may be set at a single value. Measurements are made continuously by the accelerometer using a series of overlapping sampling windows, also referred to as a 'rolling average' or other methods. A typical window length would be between 1 and 5 seconds, with a sampling frequency of at least 10 Hz. It will be appreciated by those skilled in the art that other averaging techniques may be used such as an exponential averaging technique.

Alternatively, the signal measured at step 212 could be obtained from a sensor (not shown) suitable for measuring the edgewise vibrational movement of the blades 18, such as an optical sensor, an accelerometer, a gyrosensor, a load sensor or a strain sensor placed in the root of each of the blades 18 or at other positions in the blades 18.

The signal measured at step 212 is then filtered, at step 214, using the band-pass filter. Some operational vibration and other frequency content is filtered out by the band-pass filter, leaving a signal that is substantially composed of vibration in the region of the whirling mode frequency that is caused by the edgewise vibrations of the blades 18. In this way, the process determines, obtains, or calculates a frequency spectrum in the time domain of the measured edgewise vibrational movement of the blades 18 in the proximity of the determined whirling mode frequency. In effect, this process narrows the scope of the measured acceleration or other signals indicating the edgewise vibrational movement of the blades 18 to consider only the region of the whirling mode frequency.

At step 216, a central frequency is determined from the frequency spectrum obtained in step 214 as the frequency component with the largest peak in the frequency spectrum or with the highest power spectral density.

The central frequency signal is then compared, at step 218, to the whirling mode frequency obtained from process 100 or otherwise determined.

If the central frequency is the same as the determined whirling mode frequency, the process 200 progresses to step 224, where the process 200 terminates. However, if the central frequency differs from the determined whirling mode frequency, the process 200 progresses to step 222 where the determined whirling mode frequency is adjusted, for example, so as to be the same as the central frequency. The process 200 then progresses to step 223 where the adjusted whirling mode frequency is stored in the memory module 36 for subsequent use, before the process 200 terminates at step 224. It is envisaged that the process 200 could repeat continually to adjust the determined whirling mode frequency to ensure its accuracy.

Once the whirling mode frequency has been determined using process 100 and/or process 200, a further process 300, as illustrated in FIG. 8, is used to decide how the wind turbine 10 should be controlled in view of the determined whirling mode frequency.

The process 300 initiates at step 302, which can be any time during which the wind turbine 10 is operating, and in the second step 304, the whirling mode frequency is received having been recalled from the memory module 36 by the processor 34. A rotational frequency is then calculated at the next step 306 of the process 300 based on the rotational speed of the rotor 16.

A threshold value for the whirling mode frequency, based on the rotational frequency, is then determined at step 308. The threshold value defines a buffer zone extending from the rotational frequency, and is used during the control of the wind turbine 10 to prevent the whirling mode frequency and the rotational frequency from converging to the extent that leads to resonant conditions giving rise to excessive edgewise vibrations of the blades 18. The threshold value can be calculated as a function of the determined rotational frequency. For example, the threshold value may be calculated as a percentage of the rotational frequency. That is, if the determined rotational frequency is 2 Hz, the threshold value, calculated as 10% of the determined rotational frequency, would be 2.2 Hz. In this example, the threshold value defines a buffer zone extending from the rotational frequency having a width of 0.2 Hz. Alternatively, the threshold value may be determined based on a numerical simulation of the wind turbine 10. In this case, the operation of the wind turbine 10 is simulated to identify the rotor speeds that give rise to excessive edgewise vibrational movement of the blades 18. Once identified, the rotor speeds are converted to the frequency domain to be used as a baseline for establishing the threshold value. That is, the threshold value may be the same as or, alternatively, determined as a function of the rotational frequencies that correspond to the rotor speeds identified in the numerical simulation.

The whirling mode frequency is then compared, at step 314, to the threshold value obtained at step 308. If the whirling mode frequency substantially equals or is lower than the threshold value, the process 300 progresses to step 316 where the rotor speed is reduced. Reducing the rotor speed results in a corresponding reduction in the rotational frequency to maintain the buffer zone between the two frequencies and prevent resonant conditions from developing. In one embodiment, the rotor speed is reduced until the whirling mode frequency is greater than the threshold value. In the case where the whirling mode frequency relates to a backward whirl, reducing the rotational frequency produces a corresponding increase in the whirling mode frequency, causing a divergence of the two frequencies. This divergent movement of the frequencies is beneficial when re-establishing the buffer zone as it allows the reduction in the rotational frequency, and so the rotor speed, to be minimised. On the other hand, where the whirling mode frequency relates to a forward whirl, reducing the rotational frequency produces a corresponding decrease in the whirling mode frequency. However, the respective decreases in the whirling mode frequency and the rotational frequency are not proportional, and so a reduction in the rotational frequency still has the effect of causing a divergence of the two frequencies.

If, at step 314, it is determined that the whirling mode frequency is greater than the threshold value, the process 300 progresses to step 318 where no action is taken and the rotor speed is maintained.

The process 300 terminates at step 320 following the execution of steps 316, 318. However, it is envisaged that the process 300 could repeat continually to control the rotor speed in accordance with the threshold value and its relationship with the whirling mode frequency. In that case, the process 300 could be continued from the initial step 302 or from step 314.

Figure 9:
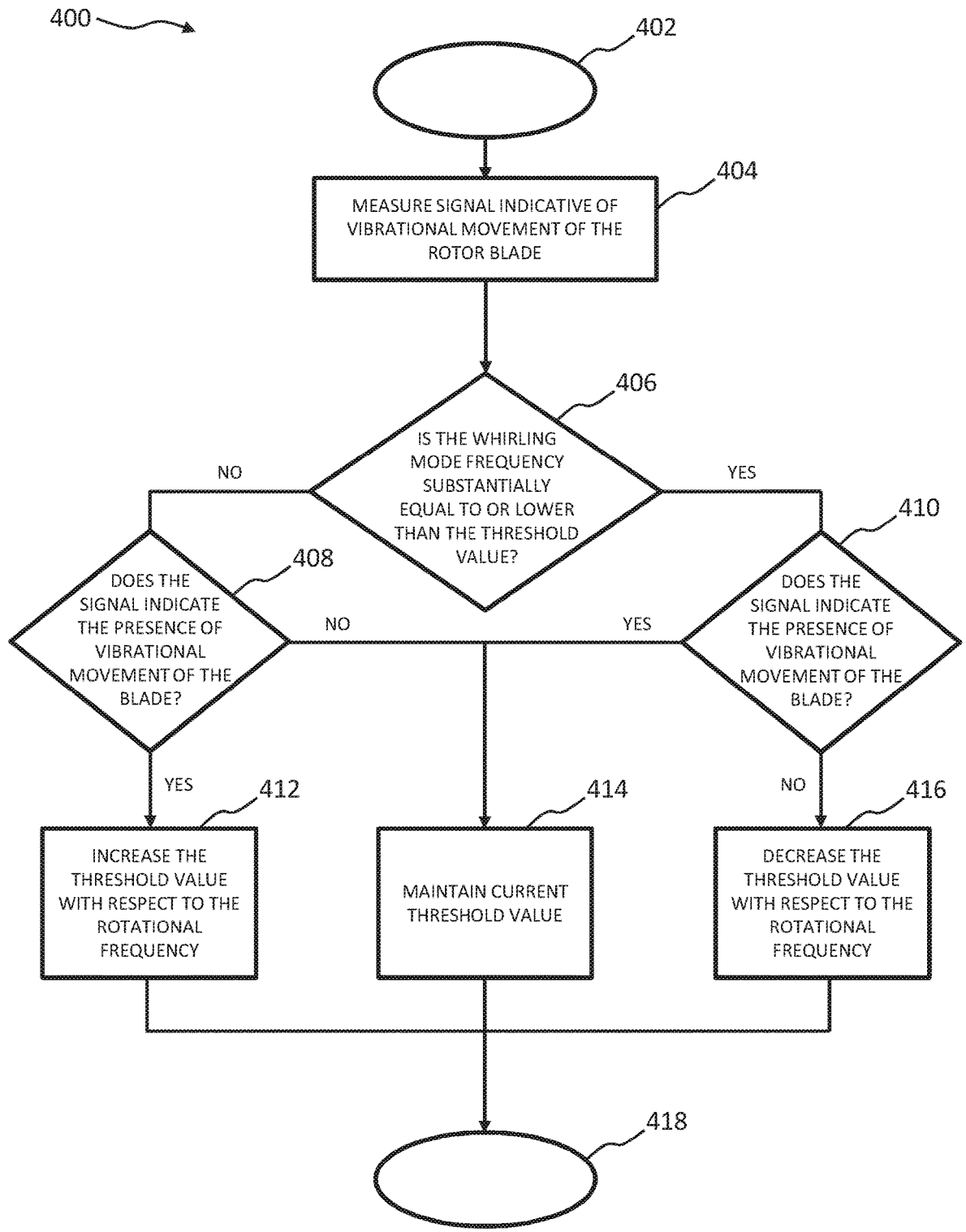

As mentioned above, the threshold value sets a limit, based on the rotational frequency, which defines a buffer zone extending from the rotational frequency. Resonant conditions can develop if the whirling mode frequency is within the buffer zone. That is, resonant conditions, which can lead to excessive edgewise vibrations of the blades 18, can develop if the whirling mode frequency substantially equals or is lower than the limit defined by the threshold value. FIG. 9 shows a process 400 for altering the threshold value determined in process 300 according to whether or not resonant conditions are observed when the whirling mode frequency substantially equals or is lower than the threshold value.

The process 400 initiates at step 402, which could be after the process 300 has been executed or, in the event that the process 300 is repeated continuously, between consecutive processes 300. At step 404, a signal indicative of an edgewise vibrational movement of the blades 18 is measured. This signal is the same as the signal measured at step 212 of the process 200. Accordingly, the signal can relate to an indirect measurement of the movement, such as measuring a component of tower acceleration, or a direct measurement, such as a measurement from a sensor placed in the root of each of the blades 18 or at other positions in the blades 18.

The whirling mode frequency is then compared, at step 406, to the threshold value. If it is determined that the whirling mode frequency is greater than the threshold value, the process 400 moves to step 408 where the signal is analysed to determine if the blades 18 are experiencing an edgewise vibrational movement. If the presence of an edgewise vibrational movement is determined, the process 400 moves to step 412 where the threshold value is increased with respect to the rotational frequency, thereby increasing the buffer zone extending from the rotational frequency. Conversely, if, at step 408, the presence of an edgewise vibrational movement is not observed, the process 400 proceeds to step 414 where the current threshold value is maintained.

Turning back to step 406, if it is determined that the whirling mode frequency substantially equals or is lower than the threshold value, the process 400 moves to step 410 where, again, the signal is analysed to determine if the blades 18 are experiencing an edgewise vibrational movement. If the presence of an edgewise vibrational movement is established, the process 400 moves to step 414 where the threshold value is maintained. However, if, at step 410, the presence of an edgewise vibrational movement is not observed, the process 400 proceeds to step 416 where the current threshold value is decreased with respect to the rotational frequency, resulting in a corresponding decrease in the buffer zone between the rotational frequency and the whirling mode frequency. Minimising the size of the buffer zone is beneficial as it avoids unnecessary reductions in the rotational frequency, and so the rotational speed of the rotor 16, when avoiding the onset of resonant conditions. Specifically, a reduction in the speed of the rotor 16 is, in some instances, accompanied by a reduction in the power outputted from the generator 26. This is done to avoid damaging the gearbox 22 due to the increase in the torque that would be required if the power outputted from the generator 26 remained the same while the speed of the rotor 16 is decreased. Accordingly, it is preferable to keep the speed of the rotor 16 as high is possible to avoid power losses and any associated damage to the gearbox 22.

The process 400 terminates at step 418 following the execution of steps 412, 414 or 416.

Figure 10:
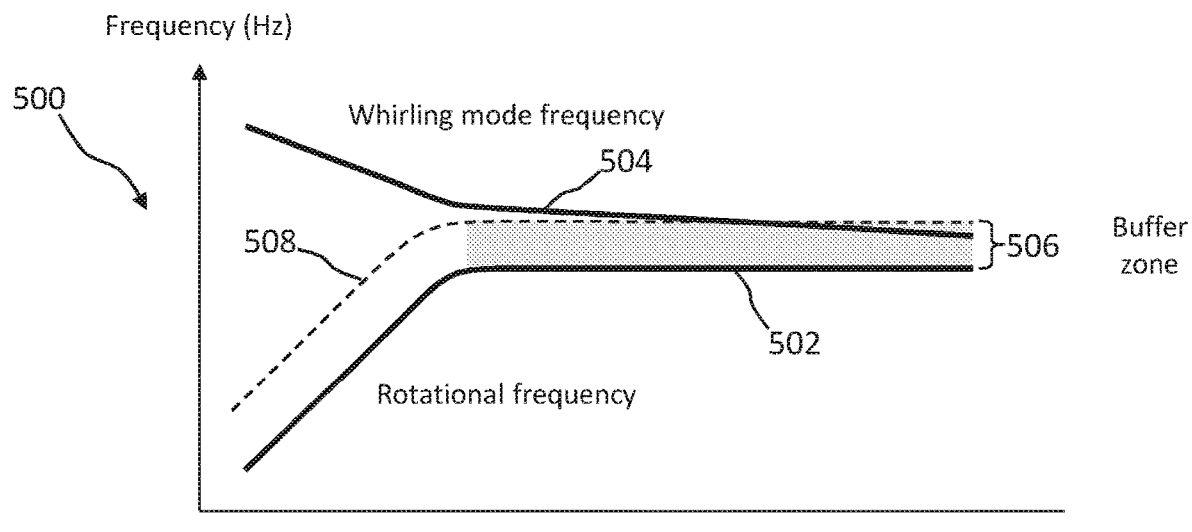
Figure 10:
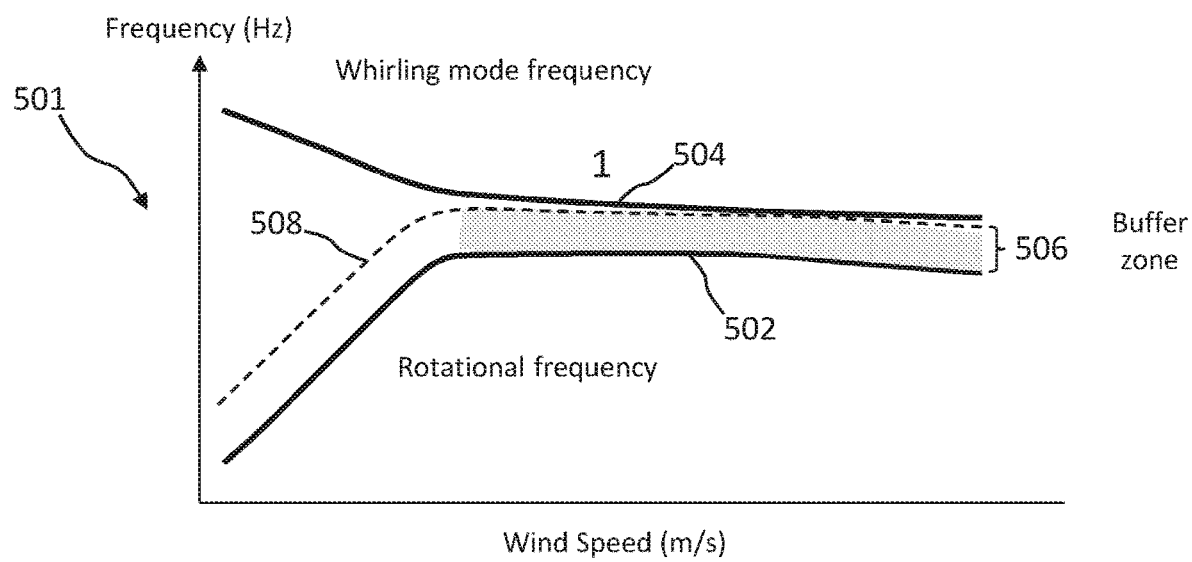

FIG. 10 shows graphs 500, 501, illustrating the corrective action carried out by the process 300. Graphs 500, 501 show curves relating to the rotational frequency 502 and the whirling mode frequency 504 over a wind speed range. Specifically, the whirling mode frequency 504 shown in this example is illustrative of a 3 P rotational frequency and backward whirling mode, and although other modes, such as a 6 P rotational frequency and backward whirling mode, behave in a similar manner, there may exist whirling modes that behave differently with respect to wind speed. Therefore, the examples shown in the graphs 500, 501 are only appropriate for whirling modes that exhibit the same general behaviour as a 3 P backward whirling mode. The buffer zone 506, which is a function of the rotational frequency 502, extends from the rotational frequency 502 and has an upper limit defined by the threshold value 508.

Turning to graph 500, it can be seen that, with respect to wind speed, the rotational frequency 502 increases up to a maximum, when the wind turbine 10 is operating in a full load operation mode, and the whirling mode frequency 504 decreases. That is, the rotational frequency 502 and the whirling mode frequency 504 tend to converge with increasing wind speed. In this example, the whirling mode frequency 504 falls below the threshold value 504 and enters the buffer zone 506 at the high end of the wind speed range. If this situation is left unchecked, the proximity of the rotational frequency 502 and the whirling mode frequency 504 within the buffer zone 506 could give rise to resonant conditions, causing the blades 18 to undergo excessive edgewise vibrational movements.

The process 300 addresses this situation by decreasing the speed of the rotor 16, and so the rotational frequency 502, as illustrated in graph 501. This causes a corresponding reduction in the threshold value 508 and an increase in the whirling mode frequency 504, which causes the two frequencies 502, 504 to diverge. This divergence serves to maintain a distance between the two frequencies 502, 504, defined by the buffer zone 506, preventing the onset resonant conditions.

In general, the speed of the rotor 16 may be controlled in any appropriate way. The adjustment of the speed of the rotor 16 to a given value may be obtained by adjusting the speed in accordance with a rotor speed set point. However, the speed of the rotor 16 may also be adjusted by other means, such as use of a rotor torque set point or output power set point. It will be appreciated by those skilled in the art that the invention has been described by way of example only, and that a variety of alternative approaches may be adopted without departing from the scope of the invention, as defined by the appended claims.

The invention claimed is:

1. A method of controlling a wind turbine for the avoidance of edgewise vibrations, the method comprising:
determining a rotational frequency of a rotor blade of the wind turbine corresponding to a speed of the rotor blade;
determining a whirling mode frequency of the rotor blade based on the rotational frequency of the rotor blade and an edgewise vibration frequency of the rotor blade;
determining a frequency spectrum of the whirling mode frequency;
filtering the whirling mode frequency using a band filter;
determining a threshold value as a function of the rotational frequency;
determining a buffer zone defined by the threshold value and the rotational frequency; and
reducing the speed of the rotor blade if the whirling mode frequency falls within the buffer zone.

2. The method of claim 1, wherein the threshold value is determined as a function of the rotational frequency and ambient wind conditions.

3. The method of claim 1, further comprising reducing the speed of the rotor blade until the whirling mode frequency is greater than the threshold value.

4. The method of claim 1, wherein the whirling mode frequency is one or more of a forward whirling mode or a backward whirling mode.

5. The method of claim 1, wherein the whirling mode frequency is determined as a function of the rotational frequency and a predetermined edgewise vibration frequency of the rotor blade.

6. The method of claim 1, further comprising:
measuring a signal indicative of a vibrational movement of the rotor blade;
and
adjusting the whirling mode frequency based on the measured signal.

7. The method of claim 6, wherein the whirling mode frequency is adjusted to equal a central frequency.

8. The method of claim 1, further comprising:
measuring a signal indicative of a vibrational movement of the rotor blade; and,
increasing the threshold value relative to the rotational frequency if the signal indicates that the rotor blade is moving; and
decreasing the threshold value relative to the rotational frequency if the signal indicates that the rotor blade is not moving.

9. The method of claim 6, wherein the signal is indicative of an edgewise vibration of the rotor blade.

10. The method of claim 6, wherein the signal is an acceleration signal indicative of the movement of the tower top of the wind turbine.

11. The method of claim 1, wherein the wind turbine is operated in full load operation mode.

12. A controller for a wind turbine control system, comprising:
a memory module comprising a set of program code instructions; and
a processor which, when executing the set of program code instructions, implements an operation of controlling a wind turbine for the avoidance of edgewise vibrations, the operation comprising:
determining a rotational frequency of a rotor blade of the wind turbine corresponding to a speed of the rotor blade;
determining a whirling mode frequency of the rotor blade based on the rotational frequency of the rotor blade and an edgewise vibration frequency of the rotor blade;
determining a frequency spectrum of the whirling mode frequency;
filtering the whirling mode frequency using a band filter;
determining a threshold value as a function of the rotational frequency;
determining a buffer zone defined by the threshold value and the rotational frequency; and
reducing the speed of the rotor blade if the whirling mode frequency falls within the buffer zone.

13. The controller of claim 12, wherein the threshold value is determined as a function of the rotational frequency and ambient wind conditions.

14. A wind turbine, comprising:
a tower;
a nacelle disposed on the tower;
a rotor extending from the nacelle and having a plurality of rotor blades disposed on a distal end; and
a controller, comprising:
a memory module comprising a set of program code instructions; and
a processor which, when executing the set of program code instructions, implements an operation of controlling the wind turbine for the avoidance of edgewise vibrations, the operation comprising:
determining a rotational frequency of a rotor blade of the wind turbine corresponding to a speed of the rotor blade;
determining a whirling mode frequency of the rotor blade based on the rotational frequency of the rotor blade and an edgewise vibration frequency of the rotor blade;
determining a frequency spectrum of the whirling mode frequency;
filtering the whirling mode frequency using a band filter;
determining a threshold value as a function of the rotational frequency;
determining a buffer zone defined by the threshold value and the rotational frequency; and
reducing the speed of the rotor blade if the whirling mode frequency falls within the buffer zone.

15. The wind turbine of claim 14, wherein the threshold value is determined as a function of the rotational frequency and ambient wind conditions.

16. A non-transitory machine readable medium comprising program code instructions for implementing an operation of controlling a wind turbine for the avoidance of edgewise vibrations, the operation comprising:
determining a rotational frequency of a rotor blade of the wind turbine corresponding to a speed of the rotor blade;
determining a whirling mode frequency of the rotor blade based on the rotational frequency of the rotor blade and an edgewise vibration frequency of the rotor blade;
determining a frequency spectrum of the whirling mode frequency;
filtering the whirling mode frequency using a band filter;
determining a threshold value as a function of the rotational frequency;
determining a buffer zone defined by the threshold value and the rotational frequency; and
reducing the speed of the rotor blade if the whirling mode frequency falls within the buffer zone.

17. The non-transitory machine readable medium of claim 16, wherein the threshold value is determined as a function of the rotational frequency and ambient wind conditions.

* * * * *